United States Patent
Harz

[11] 3,789,282
[45] Jan. 29, 1974

[54] ARRANGEMENT FOR PREVENTING CHATTERING AND SCORING OF DIRECT-CURRENT SLIP-RING BRUSHES

[75] Inventor: Hermann Harz, Berlin, Germany

[73] Assignee: Siemens Aktiengesellschaft, Munich, Germany

[22] Filed: Sept. 7, 1972

[21] Appl. No.: 286,923

[30] Foreign Application Priority Data
Sept. 10, 1971 Germany.................. P 21 46 064.0

[52] U.S. Cl..................... 318/190, 322/59, 310/148
[51] Int. Cl. ............................................ H02k 13/10
[58] Field of Search.................. 318/178–181, 186, 318/190, 197, 528, 530, 532; 310/143, 147, 148, 151, 165; 322/59, 68, 91, 92

[56] References Cited
UNITED STATES PATENTS
3,211,987 10/1965 Gatlin et al....................... 322/59 X
3,560,841 2/1971 Pannen et al................... 310/147 X Primary Examiner—Bernard A. Gilheany
Assistant Examiner—W. E. Duncanson, Jr.
Attorney, Agent, or Firm—Kenyon & Kenyon Reilly Carr & Chapin

[57] ABSTRACT

An arrangement is disclosed for preventing chattering and scoring of the slip-ring brushes of a synchronous machine during periods of time when the machine operates without load by supplying a supplementary direct-current to the brushes during these periods. The supplementary current does not flow through the winding of the machine which is connected to the brushes. The brushes are supplied from a source of alternating current through primary rectifiers connected in parallel with each other. A controllable additional rectifying circuit is arranged with respect to one of the rectifiers.

10 Claims, 5 Drawing Figures

ARRANGEMENT FOR PREVENTING CHATTERING AND SCORING OF DIRECT-CURRENT SLIP-RING BRUSHES

BACKGROUND OF THE INVENTION

The invention relates to an arrangement for preventing chattering and scoring of direct-current slip-ring brushes. More particularly the invention relates to such an arrangement for synchronous machines.

Brushes on commutators and slip rings have a tendency to chatter and promote scoring if they are operated in a no-load condition wherein the current is zero or has only a very low value. In machines with commutators and commutating poles, this situation can be alleviated by exciting the commutating poles externally to such an extent that in the armature coils short-circuited by the brushes, sufficient short-circuit currents are generated which load the brushes, so that the dificiencies mentioned are counteracted. For slip-rings, it has already been proposed to superimpose on the operating direct-current or alternating-current, an independent alternating-current which is passed only through the slip-rings and not, however, through the winding connected to the slip-rings. However, a separate super-position transformer is required for this purpose having windings through which the operating current also flows.

SUMMARY OF THE INVENTION

It is an object of the invention to provide an arrangement for preventing chattering and scoring of direct current slip-ring brushes.

The arrangement of the invention prevents chattering and scoring of the direct-current, slip-ring brushes of a synchronous machine. The machine is equipped with an excitation winding and slip-rings connected to the winding for receiving direct-current excitation through the brushes. The brushes are operated with minimal and zero values of the excitation current for given periods of time, for example, when the machine is operated at no-load.

According to a feature of the arrangement of the invention, two rectifying means are provided for supplying the slip-rings with direct-current through the brushes. The brushes are grouped into two brush sets and each of the sets includes at least two brushes corresponding to respective ones of the slip-rings of the machine. The brushes of each set are connected to a corresponding one of the rectifying means. Circuit means are provided for short circuiting the brushes of one of the sets together so as to cause the brushes of the other one of the sets to be supplied with direct-current during those periods of time when little or no excitation current flows. The direct-current supplied in this manner bypasses the excitation winding of the synchronous machine and is of sufficient magnitude to prevent chattering and scoring of the brushes.

The slip-rings thus carry direct-current in normal operation, and during those periods when they are temporarily operated without current, a direct-current is fed therethrough which is taken from the same current source which also supplies the operating direct-current. However the no-load direct-current flows only through the slip-rings and not through the winding of the machine corresponding to the slip-rings. This is accomplished advantageously by another feature of the invention wherein the circuit means includes an additional rectifying branch circuit; this circuit includes two thyristors and carries the no-load direct-current and is connected anti-parallel across one of the two rectifying means. If this additional rectifying current is blocked so that it does not conduct, the two rectifying means feed the slip-ring winding in parallel from a common alternating-current source. At no-load, the additional rectifying circuit is energized and the rectifying means across which it is connected is cut off. The current path of the current of the other one of the two rectifying means then closes only through the slip-rings and the energized additional rectifying branch circuit.

According to another embodiment of the invention, the alternating current supply source can be an alternating-current constant voltage generator. A rectifier assembly forms part of the generator for providing direct-current excitation to the excitation winding of the generator. The generator can include controllable parallel path means connected to the rectifier assembly for adjusting the excitation current supplied by the rectifier assembly to the excitation winding of the generator so as to cause said generator to supply a current to the other one of the two rectifying means sufficient to prevent chattering and scoring of the brushes. The controllable parallel path means can be in the form of a supplementary rectifying branch made up of two thyristors. The supplementary rectifying branch can be connected antiparallel to the rectifier assembly of the generator.

According to still another feature of the invention, the circuit means can include an auxiliary rectifier connected in parallel with one of the two rectifying means. Also a switch is connected across the brushes of the brush set corresponding to the other one of the two rectifying means, the switch being closable to short circuit the last-mentioned brushes. The auxiliary rectifier is connectable to a voltage that causes the auxiliary rectifier to supply the brushes and slip-rings with a current when the switch is closed and when both of the rectifying means are blocked, the last-mentioned current being of sufficient magnitude to prevent chattering and scoring of the brushes during said periods of time.

Although the invention is illustrated and described herein as an arrangement for preventing chattering and scoring of direct-current slip-ring brushes, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
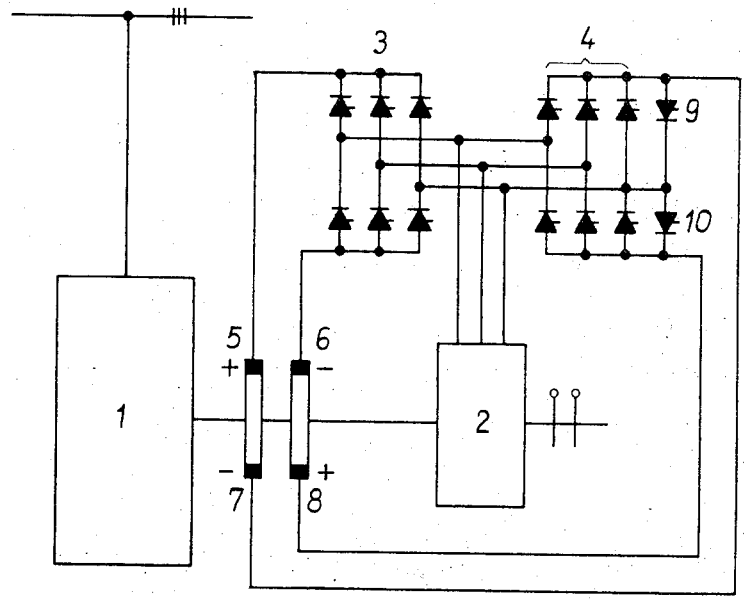
FIG. 1 is a schematic diagram of a synchronous machine provided with an arrangement according to the invention for preventing chattering and scoring of the slip-ring brushes when the machine operates, for example, under no load.

Referring to FIG. 1, the synchronous machine 1 can be a surge generator, for example, that is excited by direct-current supplied by a direct-coupled generator 2 through the two groups 3 and 4 of parallel-connected thyristor branch circuits. The generator 2 is a three-phase machine and the thyristor branch circuit groups constitute respective rectifying means in the form of primary rectifiers. The slip-ring brushes are grouped into two sets, the one primary rectifier 3 being connected to one set 5, 6 and the other primary rectifier 4, to the other set 7, 8. Circuit means in the form of an additional rectifying branch circuit is connected anti-parallel to the primary rectifier 4 and includes two thyristors 9, 10. The center point of the additional rectifying branch circuit is connected to the center point of a branch circuit of the primary rectifier 4.

The operation of the arrangement of FIG. 1 will now be described. When the generator 1 operates with normal excitation, the thyristors 9, 10 of the additional branch circuit remain blocked, and the excitation of the synchronous machine 1 can be influenced at will by the degree of modulation of the two primary rectifiers 3, 4. If the synchronous machine is not excited after the load cycle is completed, but is nevertheless to continue to run with current-carrying slip-ring brushes, the primary rectifier 4 is blocked and the thyristors 9 and 10 of the additional branch circuit are turned on. Because the primary rectifier 3 continues to be operative, the current path through components 3, 5, 7, 9, 10, 8, 6 and 3 is possible, that is, with the synchronous machine 1 unexcited, the brushes can be loaded with a current that is sufficient to preclude the occurrence of chattering or scoring of the slip-ring brushes. Because the center point of the additional circuit branch is connected with the center point of a component branch of the primary rectifier 4, it has the alternating-current potential of a terminal of the stator winding of the shaft-mounted generator 2. This causes the current of the thyristors 9 and 10 to become zero at time intervals of 180° for 60° each time, so that they can be cut off again at any time and so make the excitation of the synchronous machine 1 effective.

Figure 2:
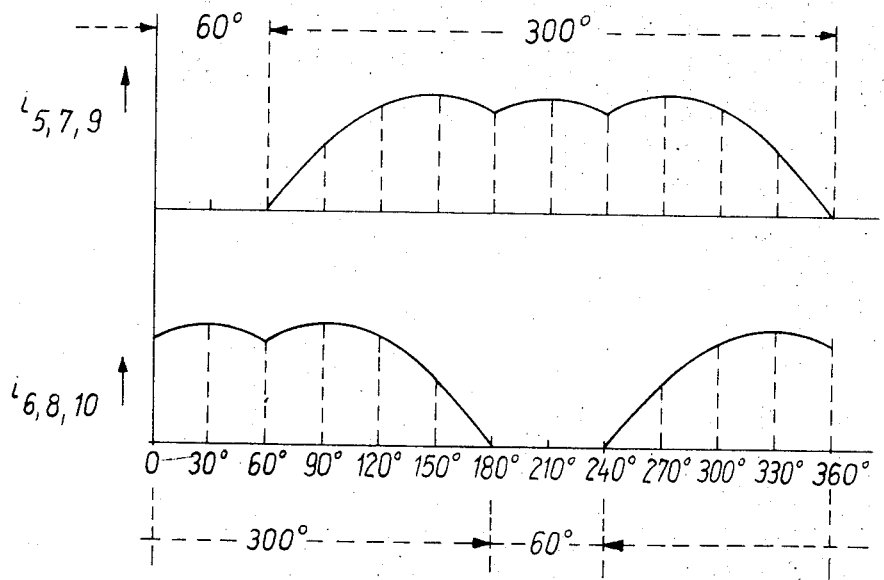
FIG. 2 shows the currents as a function of time which flow through the brushes under the no-load condition for the arrangement of the invention of FIG. 1.

The upper portion of FIG. 2 shows the wave shape of the current as a function of time for the thyristor 9 and the brushes 5 and 7, and in the lower portion of FIG. 2, the current for thyristor 10 and the brushes 6 and 8 is illustrated. FIG. 2 shows that thyristor 9 is nonconductive in the range 0° to 60°, and the thyristor 10 in the range from 180° to 240°. The additional branch can therefore be blocked again when desired.

If the shaft-mounted generator 2 is configured as a constant-voltage generator, any desired excitation current can be adjusted by means of the two controllable primary rectifiers 3 and 4. The required voltages for the build-up and reduction of the field in the synchronous machine 1 can also be applied to the excitation winding without delay in this manner. However, for operation with no current in the excitation winding, it is not advisable to run the shaft-mounted generator 2 at full ceiling voltage and to trim therefrom small voltage-time areas by means of the primary rectifier 3 for the small resistive voltage drop in the short-circuit path which would result in an intensely intermittent current. It is more advisable in this situation to reduce the excitation of the shaft-mounted generator to the extent that the primary rectifier 3 can be modulated as fully as possible. If the shaft-mounted generator 2 is constructed as a constant-voltage generator, it is sufficient to apply to the alternating-current side of its excitation rectifier a small separate alternating-current voltage which excites the shaft-mounted generator only to the extent that the small voltage drops in the short-circuit path are covered. Such an arrangement is illustrated in FIG. 3.

Figure 3:
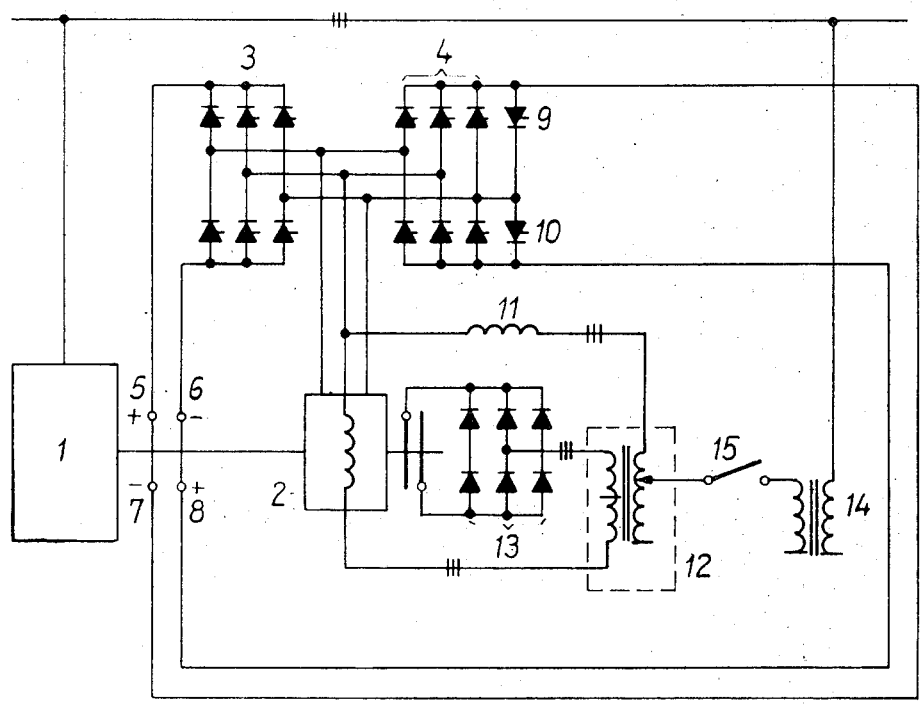
FIG. 3 illustrates an alternate embodiment of the invention wherein the current through the brushes for preventing chattering and scoring thereof is determined by additional components connected to an appropriate voltage.

Referring now to FIG. 3, it is noted that the same reference symbols are used as in FIG. 1 insofar as they pertain to like features. The shaft-mounted generator 2 is assumed to be constructed as a constant-voltage generator, which is excited in dependence upon load via the choke 11 the summing current transformer 12 and the rectifier 13. A small transformer 14 is connected to the line and has a secondary winding which can be connected via the switch 15 to a suitable winding tap of the summing transformer 12.

The operation of the arrangement of FIG. 3 will now be described. If the synchronous machine 1 is to be run without excitation, the primary rectifier 4 is blocked as in the arrangement according to FIG. 1, and the additional rectifying branch 9, 10 is energized. As in the arrangement of FIG. 1, a definite, intermittent current through the brushes 5, 6 and 7, 8 can be adjusted by means of the main rectifier 3. If the switch 15 is now closed, only a small constant voltage is present at the slip-rings of the shaft-mounted generator 2 which causes the generator 2 to drive a definite permissible short-circuit current through the brushes. The main rectifier 3 is completely enabled here so that the currents in components 5, 7, 9 and 6, 8, 10 shown in FIG. 2 can develop.

Because the rectifier 13 is connected to a constant voltage by the switch 15, the currents fed via the choke 11 and the shaft-mounted generator 2 into the summing current transformer 12 are made ineffective by the corresponding current taken up by the transformer 14. It is therefore in this instance not possible for the shaft-mounted generator 2 to become excited. Only if the switch 15 is opened can the shaft-mounted generator 2 be excited again to its full voltage which corresponds to the ceiling voltage available at the slip-rings of the synchronous machine 1, and the synchronous machine can again be operated with any desired excitation as soon as the additional branch circuit 9, 10 is blocked and the two primary rectifiers 3, 4 are in operation.

It is also possible to operate the generator 2 with controllable parallel path means connected to the excitation rectifier 13 and to adjust the generator 2 in short-circuit condition to the desired short-circuit current for the brushes. In this instance, the transformer 14 and switch 15 are not required.

Figure 4:
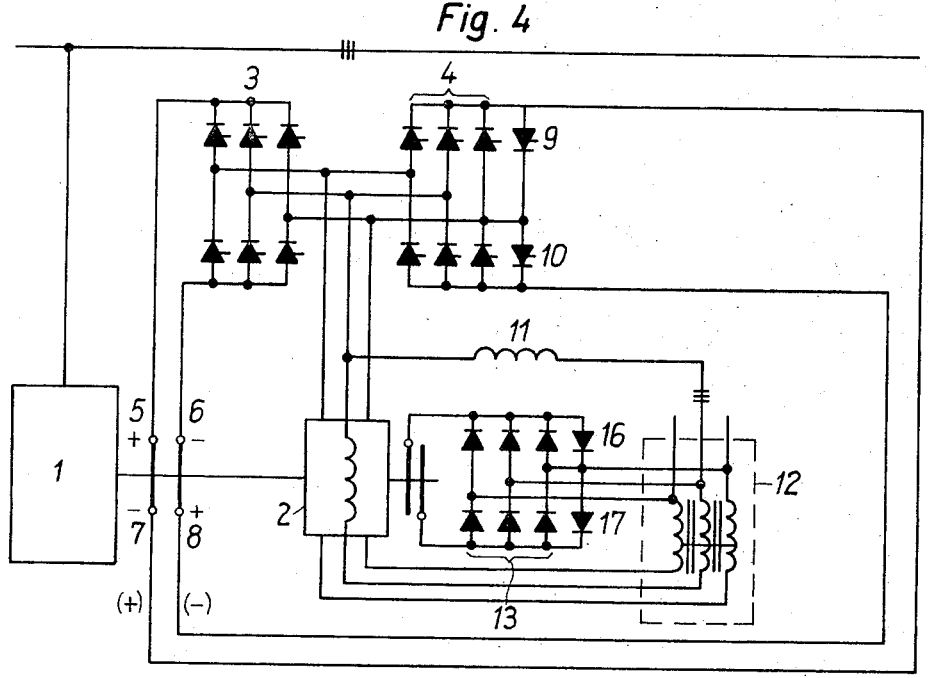
FIG. 4 illustrates another embodiment of the invention wherein current for preventing chattering and scoring is determined by a controllable parallel path forming part of the alternating-current constant voltage generator associated with the synchronous machine.

FIG. 4 illustrates such an arrangement and again the same reference numerals are used as in the preceding FIGS. where they pertain to like features. A supplementary rectifying branch is connected anti-parallel to the direct-current terminals of the rectifier 13 which excites the generator 2. The supplementary rectifying branch is made up of the two thyristors 16 and 17 and short circuits the rectifier 13 so that the voltage of the generator 2 collapses. In order that the supplementary rectifying branch 16, 17 can be turned off again, the center circuit location of the rectifying branch 16, 17 is connected in parallel with the center circuit location of a branch circuit of the rectifier 13, this connection being made in the same manner as with the additional rectifying branch circuit 9, 10 and the primary rectifier 4.

Also, for the condition of no-load operation without excitation and after the primary rectifiers 3 and 4 are completely blocked, the brushes 7 and 8 can be short-circuited through a switch and the two brushes 5 and 6 can be supplied via a special uncontrolled auxiliary rectifier. The uncontrolled auxiliary rectifier can be coupled for example to the generator 2 through a transformer. In this instance, the generator 2 can remain excited at its constant ceiling voltage. In this way, the brushes and slip-rings are supplied under no-load from this rectifier with the direct current which is deemed necessary and which is sufficient to prevent chattering and scoring. The additional circuit branch 9 and 10 is in this instance not required. When transferring to normal operation, the switch which short-circuits the brushes 7 and 8 merely has to be opened.

Figure 5:
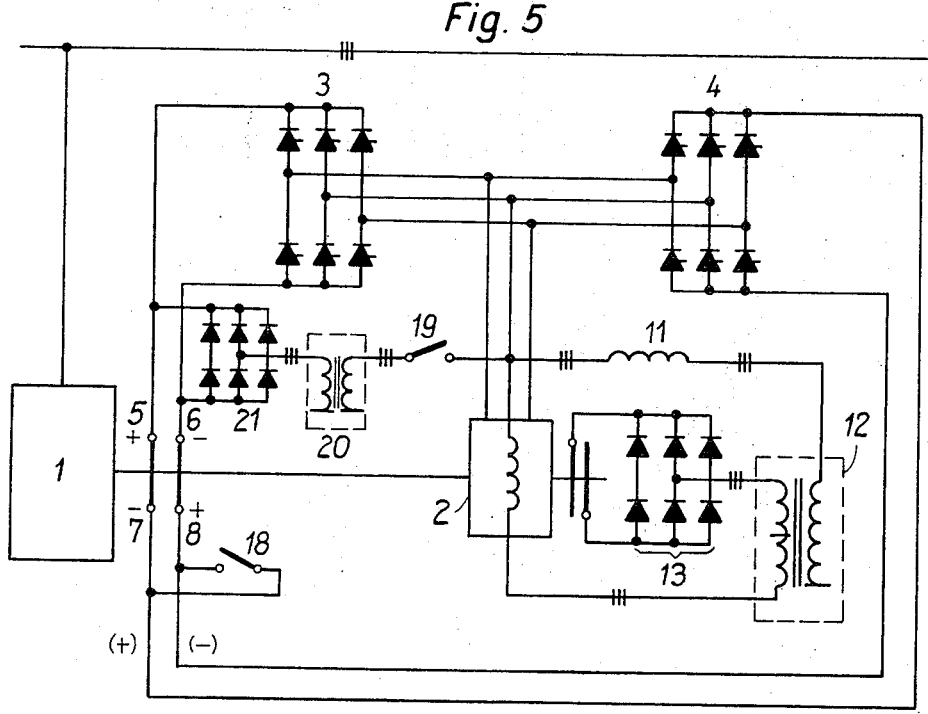
FIG. 5 illustrates still another embodiment wherein the current for preventing chattering and scoring is determined with the aid of an auxiliary rectifier.

An embodiment of such an arrangement is illustrated in FIG. 5. The additional rectifier branch 9 and 10 is not required on the primary rectifier 4 and both primary rectifiers 3 and 4 are completely blocked during the unexcited no-load condition. The two switches 18 and 19 are then closed to thereby drive a current over the transformer 20 and the rectifier 21 as well as the brushes 5, 6, 7 and 8; this current prevents no-load chattering of the brushes for the condition where the excitation of the primary machine 1 is fully de-energized. The polarity present at the brushes for this condition is shown by the signs + and − in FIG. 5. During normal operation the brushes 5 and 6 maintain this polarity, whereas the brushes 7 and 8 assume the opposite polarity which is indicated in FIG. 5 by the plus and minus signs in parenthesis.

What is claimed is:

1. Arrangement for preventing chattering and scoring of the direct-current, slip-ring brushes of a synchronous machine having an excitation winding and slip-rings connected to the winding for receiving direct-current excitation through the brushes, the brushes being operated for given periods of time with minimal and zero values of the excitation current, the arrangement comprising two rectifying means for supplying the slip rings with direct-current through the brushes, the brushes being grouped into two brush sets, each of said sets including at least two brushes corresponding to respective ones of the slip rings, the brushes of each set being connected to a corresponding one of said rectifying means, and circuit means for short circuiting the brushes of one of said sets together so as to cause the brushes of the other one of said sets to be supplied with direct-current during said periods of time, said last-mentioned current bypassing the excitation winding of the synchronous machine and being of sufficient magnitude to prevent chattering and scoring of the brushes.

2. The arrangement of claim 1 wherein each of said rectifying means has an alternating-current input end and wherein the arrangement comprises alternating-current supply means connected to said input end of each of said rectifying means, and each of said rectifying means comprising control means for adjusting the direct-current supplied to the slip rings.

3. The arrangement of claim 2, said alternating-current supply means comprising an alternating-current constant voltage generator.

4. The arrangement of claim 3 comprising coupling means for coupling said voltage generator to the synchronous machine.

5. The arrangement of claim 2, each of said rectifying means comprising a plurality of rectifying branches connected in parallel across the brushes of the corresponding brush set, each of said branches comprising two controllable rectifying components connected in series in the same rectifying direction, the circuit connection serially connecting the components of each branch defining a terminal of said input end, and circuit means comprising two controllable rectifying components serially connected together at a center node to form an additional rectifying branch, said additional rectifying branch being connected antiparallel across one of said rectifying means, said center node being connected to the terminal of one of said branches of said one of said rectifying means, each of said rectifying components of said additional rectifying branch having control means for controlling the flow of current therethrough, whereby said one rectifying means is blocked when said control means of said components of said additional rectifying branch is released to place said additional rectifying branch in conduction thereby placing a short-circuit current path across the brushes of said brush set corresponding to said one rectifying means during said periods of time.

6. The arrangement of claim 5, said components of said additional rectifying branch being thyristors.

7. The arrangement of claim 6, said control means of the other one of said rectifying means comprising gate electrodes corresponding to respective ones of said rectifying components thereof, said gate electrodes being connectable to an adjustable voltage for controlling the current passed through the brushes of said brush sets and the slip rings during said periods of time.

8. The arrangement of claim 5, said alternating current supply means comprising an alternating-current constant voltage generator, a switch, a transformer connectable to a source of alternating-current energy through said switch, a summing transformer assembly for exciting said generator, said transformer assembly being connected to said transformer, said transformer being connected so as to apply a determined voltage to said transformer assembly when said switch is closed, said determined voltage applied to said transformer assembly in turn causing said generator to apply a voltage to the other one of said two rectifying means whereby said control means of said other rectifying means is released and the current supplied by said generator is of sufficient magnitude to prevent chattering and scoring of the brushes.

9. The arrangement of claim 5, said alternating current supply means comprising an alternating-current constant voltage generator, a rectifier assembly forming part of the generator for providing direct-current excitation to the excitation winding of the generator, said generator including controllable parallel path means connected to said rectifier assembly for adjusting the excitation current supplied by said rectifier assembly to said excitation winding of said generator so as to cause said generator to supply a current to said other one of said rectifying means sufficient to prevent chattering and scoring of the brushes.

10. The arrangement of claims 2, said circuit means comprising an auxiliary rectifier connected in parallel with one of said rectifying means, and a switch connected across the brushes of the brush set corresponding to the other one of said rectifying means, said switch being closable to short circuit said last-mentioned brushes, said auxiliary rectifier being connectable to a voltage that causes said auxiliary rectifier to supply the brushes and slip rings with a current when said switch is closed and when both of said rectifying means are blocked, said last-mentioned current being of sufficient magnitude to prevent chattering and scoring of the brushes during said periods of time.

* * * * *